Patented Feb. 15, 1949

2,461,906

UNITED STATES PATENT OFFICE 2,461,906

PRODUCTION OF HALOGENATED ALCOHOLS AND FORMALS

Thomas E. Londergan, Niagara Falls, N. Y., assignor to E. I. du Pont de Nemours & Company, Wilmington, Del., a corporation of Delaware No Drawing. Application July 2, 1946,
Serial No. 681,133

5 Claims. (Cl. 260—615)

This invention relates to the production of halogenated alcohols and formals and, more particularly, it relates to the production of halogenated alcohols and formals by reacting formaldehyde and a hydrogen halide with a substance taken from the group consisting of olefines and halogenated olefines.

Halogenated alcohols have been produced, prior to this invention, by reacting formaldehyde and a hydrogen halide with an olefine or a halogenated olefine in the presence of an acidic halide. The patent to Fitzky, No. 2,124,851 discloses such a process. The reaction involved in this process proceeds slowly and when applied to polyhalogenated olefines, the process can only be carried out with difficulty. The process of the Fitzky patent cannot be carried out with trichlorethylene.

It is an object of this invention to react a hydrogen halide and formaldehyde with an olefine or a halogenated olefine containing not to exceed three halogens at an increased speed of reaction.

It is another object of this invention to react a hydrogen halide and formaldehyde with trichlorethylene.

Other objects of the invention will appear hereinafter.

The objects of this invention may be accomplished, in general, by reacting formaldehyde and a hydrogen halide taken from the group consisting of hydrogen chloride, hydrogen bromide and hydrogen iodide, with a substance taken from the group consisting of olefines and halogenated olefines in the presence of phosphoric acid and a salt taken from the group consisting of zinc chloride and aluminum chloride.

The reaction is preferably carried out with less than 5% by weight of water present in the reaction mass. If formaldehyde is used as such it is, therefore, preferably used in its substantially dry, gaseous form. The formaldehyde for the reaction may also be added in the form of paraformaldehyde, trioxane, polyoxymethylene ethers or other polymeric forms of formaldehyde which liberate substantially anhydrous formaldehyde under acidic conditions. The term "formaldehyde" as used throughout the specification and claims is intended to include formaldehyde polymers which liberate formaldehyde under the conditions of the reaction. As hydrogen halide, hydrogen chloride is preferred, but hydrogen bromide or hydrogen iodide may also be used.

Any olefine or halogenated olefine represented by the following formula can be reacted in accordance with this invention:

$$Q-C=C-R$$
$$\phantom{Q-}X\phantom{=}X'$$

in which Q designates alkyl, hydrogen or halogen (chlorine, bromine, or iodine), X and X' designated hydrogen or halogen, and R designates hydrogen or alkyl. Preferably, the olefine or halogenated olefine should not contain to exceed a total of five carbon atoms.

The phosphoric acid should be present in an amount of at least 5% of the total weight of the reactants. The zinc chloride or aluminum chloride should also be present in an amount of at least 5% of the total weight of the reactants.

The reaction may be carried out at ordinary room temperature (of the order of 21° C.) or it may be carried out at a slightly elevated temperature, preferably at a temperature below 100° C.

The following example is given to illustrate the production of tetrachloropropanol and tetrachloropropyl formal from trichlorethylene, hydrogen chloride and formaldehyde (source, paraformaldehyde). It is to be understood, however, that the invention is not limited to the details set forth in this example.

*Example*

In a 2-liter, 3-neck flask fitted with stirrer, thermometer, condenser and inlet tube extending beneath the surface, were placed 300 grams $ZnCl_2$, 200 grams syrupy $H_3PO_4$, and 263 grams of trichlorethylene. The contents of the flask were heated to 70° C. and 63 grams of paraformaldehyde added. With stirring, dry hydrogen chloride was bubbled into the reaction mixture until no more was absorbed. This required about two and one-half hours and the temperature was 75–80° C. After cooling, the top layer was separated and washed with water. The lower layer was diluted with water and extracted with methylene chloride. The extract was mixed with the top layer, dried and fractionated at reduced pressure. Seventy-four (74) grams of trichlorethylene was recovered and 172 grams of a mixture of tetrachloropropanol and tetrachloropropyl formal was obtained. The alcohol had B. P. of 90–100° C. at 6 mm., and the formal had B. P. of 160–185° C. at 4 mm. The ratio of alcohol to formal, obtained in this reaction, was approximately 1:2.

Olefines and halogenated olefines having a lower halogen content than trichlorethylene can be reacted much faster than trichlorethylene as illustrated in the example. The procedure steps and the relative amounts of reactants described in the example can be similarly used for the production of other halogenated alcohols and formals.

The essential feature of this invention lies in the fact that a mixture of phosphoric acid and zinc or aluminum chloride makes it possible to react formaldehyde and hydrogen halides with polyhalogenated olefines which are difficult to react or are unreactive under previously known conditions, or to react olefines or halogenated olefines at greater reaction speeds than known heretofore.

The products produced by the present invention comprise halogenated alcohols and formals which show promise as fungicides and insecticides and may have great utility in pharmaceutical and flame-proofing applications.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process which comprises reacting formaldehyde and a hydrogen halide taken from the group consisting of hydrogen chloride, hydrogen bromide and hydrogen iodide with a substance having the formula

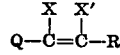

in which Q is a member of the group consisting of hydrogen, alkyl and halogen, X and X' are members of the group consisting of hydrogen and halogen, and R is a member of the group consisting of hydrogen and alkyl, in the presence of at least 5% by weight of phosphoric acid and at least 5% by weight of a substance taken from the group consisting of zinc chloride and aluminum chloride.

2. The process which comprises reacting formaldehyde and hydrogen chloride with a substance having the formula

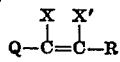

in which Q is a member of the group consisting of hydrogen, alkyl and halogen, X and X' are members of the group consisting of hydrogen and halogen, and R is a member of the group consisting of hydrogen and alkyl, in the presence of at least 5% by weight of phosphoric acid and at least 5% by weight of a substance taken from the group consisting of zinc chloride and aluminum chloride.

3. The process which comprises reacting formaldehyde and hydrogen chloride with a substance having the formula

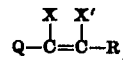

in which Q is a member of the group consisting of hydrogen, alkyl and halogen, X and X' are members of the group consisting of hydrogen and halogen, and R is a member of the group consisting of hydrogen and alkyl, in the presence of at least 5% by weight of phosphoric acid and at least 5% by weight of a substance taken from the group consisting of zinc chloride and aluminum chloride.

4. The process which comprises reacting formaldehyde and a hydrogen halide taken from the group consisting of hydrogen chloride, hydrogen bromide and hydrogen iodide with a substance having the formula

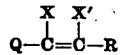

in which Q is a member of the group consisting of hydrogen, alkyl and halogen, X and X' are members of the group consisting of hydrogen and halogen, and R is a member of the group consisting of hydrogen and alkyl, in the presence of at least 5% by weight of phosphoric acid and at least 5% by weight of a substance taken from the group consisting of zinc chloride and aluminum chloride, said reaction mass containing not to exceed 5% by weight of water.

5. The process which comprises reacting formaldehyde and hydrogen chloride with trichlorethylene in the presence of at least 5% by weight of phosphoric acid and at least 5% by weight of a substance taken from the group consisting of zinc chloride and aluminum chloride, said reaction mass containing not to exceed 5% by weight of water.

THOMAS E. LONDERGAN.

REFERENCES CITED

The following references are of record in the file of this patent:

UNITED STATES PATENTS

| Number | Name | Date |
|---|---|---|
| 2,124,851 | Fitzky | July 26, 1938 |
| 2,308,192 | Mikeska et al. | Jan. 12, 1943 |

FOREIGN PATENTS

| Number | Country | Date |
|---|---|---|
| 507,571 | Great Britain | June 14, 1939 |